United States Patent [19]

Mizutani et al.

[11] 4,338,240

[45] Jul. 6, 1982

[54] CURABLE MATERIAL AND PROCESS FOR PRODUCTION THEREOF

[75] Inventors: Kiyokazu Mizutani, Inazawa; Takahisa Ogasawara, Tohkai, both of Japan

[73] Assignee: Toagoesi Chemical Industry Co., Ltd., Tokyo, Japan

[21] Appl. No.: 276,488

[22] Filed: Jun. 23, 1981

[30] Foreign Application Priority Data

Jul. 16, 1980 [JP] Japan .................................. 55/96175

[51] Int. Cl.³ .............................................. C08G 18/30
[52] U.S. Cl. ...................................... 524/284; 528/49; 524/356; 524/366; 524/462; 524/465; 524/474; 524/590

[58] Field of Search ............... 260/30.4 N, 31.2 N, 260/32.8 N, 33.2 R, 33.6 UB, 33.8 UB; 528/49

[56] References Cited

U.S. PATENT DOCUMENTS

4,098,772  7/1978  Bonk et al. ............................. 528/49

*Primary Examiner*—Maurice J. Welsh
*Attorney, Agent, or Firm*—Cooper, Dunham, Clark, Griffin & Moran

[57] ABSTRACT

A curable urethane material which shows no change in volume on polymerization and curing is prepared from polyisocyanate compound, polyhydroxy compound and a new compound 1-alkyl-4-hydroxymethyl-2,6,7-trioxabicyclo[2,2,2]octane.

8 Claims, No Drawings

CURABLE MATERIAL AND PROCESS FOR PRODUCTION THEREOF

SUMMARY OF THE INVENTION

This invention relates to a new curable material which gives no or substantially no shrinkage in volume upon the polymerization and which is composed of the urethanes having as the terminal group and/or as the side-chain group at least one urethane group containing a bicyclic ortho-ester. More particularly, this invention relates to a new curable material which brings about no or substantially no change in volume upon the ring-opening polymerization and which is composed of the urethanes derived from the reactions between a polyisocyanate, a polyalcohol and a new compound, 1-alkyl-4-hydroxymethyl-2,6,7-trioxabicyclo[2,2,2]octane. This invention also relates to a method for the production of such curable material.

BACKGROUND OF THE INVENTION

Most of polymerizable compounds known hithertofore undergo positive shrinkage in volume on polymerization. Thus, for example, ethylene, vinyl chloride, methyl methacrylate and styrene gives rise to a calculated shrinkage of about 15% to 66% during the addition polymerization (see William J. Bailey "J. Macromol. Sci. Chem." A9(5) pp. 849–865 (1975)). In cationic ring-opening polymerization of epoxides, considerable shrinkage in volume will occur, although the degree of shrinkage in that case is often less than that observed during the addition polymerization of the vinyl compounds. By way of reference, calculated shrinkages of some epoxides on the ring-opening polymerization are 23% for ethylene oxide; 17% for propylene oxide; 9% for styrene oxide; 12% for epichlorohydrin; and 20% for 2,2-dimethylethylene oxide. The calculated shrinkage in volume under discussion is given by the following equation:

$$\left[1 - \frac{\text{Specific gravity of monomer to be polymerized}}{\text{Specific gravity of polymer derived from monomer}}\right] \times 100$$

With such known monomers that will polymerize with an appreciable shrinkage in volume, there are problems that they provide no dimensional accuracy when used as molding materials, and that where used as casting materials, they impose strains due to the shrinkage on castings and cause reduction in adhesion to a mold as well as inaccuracy of the dimension of the castings. There are further problems in use that such monomers may lead to reduction in cohesion to a substrate or formation of warpage due to the internal strains when used as paints or adhesives.

Therefore, for a number of industrial applications including precision castings, strain-free composites, paints and adhesives, it is highly desirable to have curable materials which will present nearly zero change in volume on polymerization.

Certain bicyclic monomers which may polymerize with expansion in volume have been reported by William J. Bailey as described in the afore-mentioned literature (J. Macromol. Sci. Chem.). According to the literature, the spiro orthocarbonate of the formula:

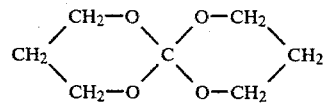

indicates a positive expansion of 2 to 17% upon its ring-opening polymerization.

We have extensively researched in an attempt to provide a new curable material which will polymerize and cure with no substantial change in volume. As a result, we have now succeeded to produce a new curable material which brings about substantially neither expansion nor shrinkage in volume on polymerization and curing and which may be produced in a facile way by reacting commercially available known compounds with a new compound, 1-alkyl-4-hydroxymethyl-2,6,7-trioxabicyclo[2,2,2]octane now synthetized by the present inventors.

An object of this invention is to provide a new curable material which polymerizes and cures with substantial no change in volume and hence is useful as moulding materials for manufacture of various articles, and particularly shaped articles by precision-casting technique and also useful as the material for use in adhesives and paints. Another object is to provide a process for the production of such new curable material which is conducted in a facile way. Further objects of this invention will be clear from the following descriptions.

DETAILED DESCRIPTION OF THE INVENTION

According to an aspect of this invention, there is provided a curable material comprising urethanes having as the terminal group and/or as the side-chain group at least one urethane group containing a bicyclic ortho-ester ring and represented by the formula

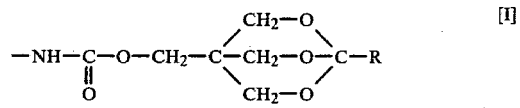

wherein R is a lower alkyl group, particularly an alkyl group of 1-6 carbon atoms, the urethanes being the reaction product formed by reacting (A) at least one polyisocyanate compound having at least two isocyanate groups, (B) at least one polyhydroxy compound having at least two hydroxyl groups and (C) at least one 1-alkyl-4-hydroxymethyl-2,6,7-trioxabicyclo[2,2,2]octane of the formula

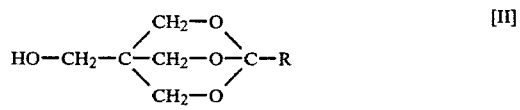

wherein R is as defined above.

The reaction product of which the new curable material of this invention consists may be produced, for example, by four alternative procedures (i) to (iv) as described below.

(i) The first procedure is a one-stage process which comprises reacting at a time (A) at least one polyisocyanate compound, (B) at least one polyhydroxy compound and (C) at least one bicyclic ortho-ester of the formula [II], for instance, in such a way that polyisocyanate compound is admixed with a mixture of polyhydroxy compound with bicyclic ortho-ester compound of the formula [II], whereupon the urethanation reaction takes place in one stage to give the reaction product of urethanes having as the terminal group and/or as the side-chain (pendant) group the urethane group containing the bicyclic ortho-ester group and represented by the formula [I]. This urethanation reaction may often involve a highly exothermic reaction, depending on the reactivities of hydroxyl groups of the polyhydroxyl compound and the bicyclic ortho-ester compound [II] employed as well as on the reactivity of polyisocyanate compound employed. In that case, in order to prevent too great elevation in temperature of the reaction mixture, it is recommendable that either one of polyisocyanate compound and the mixture of polyhydroxy compound bicyclic ortho-ester compound [II] is added in small portions or dropwise to the other. The reaction is usually carried out at a temperature of 20° C. to 100° C., preferably 50° to 85° C.

The amount of polyisocyanate compound used is usually in slight excess of the stoichiometric amount required to react with the available hydroxyl groups provided by the polyhydroxy compound and by the bicyclic ortho-ester compound [II] used, so as to form urethane linkages. However, the amount of polyisocyanate compound used may generally be such that the ratio of "isocyanate equivalents" of the polyisocyanate compound to total "hydroxyl equivalents" of the polyhydroxy compound and the bicyclic ortho-ester compound [II] charged into the reaction system should be in the range of 0.9 to 1.1.

Herein, by the term "isocyanate equivalents" of the polyisocyanate compound is meant a value of chemical equivalents which is calculated by dividing the molar quantity of the polyisocyanate compound used by the number of isocyanate groups per molecule of the polyisocyanate compound. By the term "hydroxyl equivalents" of the polyhydroxy compound or of the bicyclic ortho-ester compound [II] is meant a value of chemical equivalents which is calculated by dividing the molar quantity of the polyhydroxy compound or bicyclic ortho-ester compound by the number of available hydroxyl groups per molecule of the polyhydroxyl compound or bicyclic ortho-ester compound.

The molar ratio of the polyhydroxyl compound to the bicyclic ortho-ester compound [II] may vary as appropriate depending on the molecular weight of the polyhydroxyl compound employed and the molecular weight of the final reaction product (the curable material of this invention). However, the molar ratio should be usually not more than 20. Thus, the molecular weight of the reaction product formed from the three reagents (A), (B) and (C) can be controlled mainly by changing the molar ratio of the polyhydroxyl compound to the bicyclic ortho-ester compound [II] charged. In general, it is likely that the greater the molar ratio of the polyhydroxyl compound to the bicyclic ortho-ester compound [II] charged, the higher the molecular weight of the resulting reaction product.

(ii) The second procedure is a two-stage process which comprises the first stage of reacting (A) at least one polyisocyanate compound with (B) at least one polyhydroxy compound so as to form an intermediate partially urethanated product still containing at least one unreacted isocyanate group as the terminal group and/or as the side-chain (pendant) group thereof; and the second stage of reacting the unreacted isocyanate groups of the intermediate product from the first stage with (C) at least one bicyclic ortho-ester compound [II] to form the final reaction product having the urethane of the formula [I] containing the bicyclic ortho-ester ring. In the first stage of this second procedure, the amount of polyhydroxy compound used is such that the ratio of the isocyanate equivalents of polyisocyanate compound charged to the hydroxyl equivalents of polyhydroxy compound charged is about 1.1 or more. By changing this ratio, it is feasible to control the molecular weight of the final reaction product which will be derived from the reaction of the second, final stage. If the amount of polyhydroxy compound used is such that the ratio of the isocyanate equivalents of polyisocyanate compound to the hydroxyl equivalents of polyhydroxy compound is less than said value of about 1.1, the resulting final reaction product can sometime show a considerably increased molecular weight and a too low curability. If the ratio of the isocyanate equivalents to the hydroxyl equivalents is increased beyond said value of about 1.1, the intermediate partially urethanated product from this first stage contains an increased number of unreacted isocyanate groups, so that the final reaction product of the second stage contains an increased proportion of such urethane which is formed through the urethane-forming reaction of the isocyanate groups of polyisocyanate compound with the bicyclic ortho-ester compound [II] and which is represented by the formula

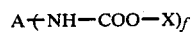

$$A\text{\textendash}(NH\text{\textemdash}COO\text{\textemdash}X)_f \qquad [III]$$

wherein A stands for the residue of polyisocyanate compound employed; f represents an integer corresponding to the functionality (that is, the number of isocyanate groups present in a single molecule) of polyisocyanate compound employed; and X stands for the group

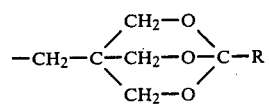

$$\begin{array}{c} \phantom{XX}\diagup CH_2\text{\textemdash}O\diagdown \\ \text{\textemdash}CH_2\text{\textemdash}C\text{\textemdash}CH_2\text{\textemdash}O\text{\textemdash}C\text{\textemdash}R \\ \phantom{XX}\diagdown CH_2\text{\textemdash}O\diagup \end{array} \qquad [IV]$$

where R is a lower alkyl group of 1–6 carbon atoms. The urethane of the formula [III] essentially contains two or more bicyclic ortho-ester groups of the formula [IV] and is a polyfunctionally opening-polymerisable compound, and hence it is will serve to increase the degree of formation of cross-linkages when the resulting final reaction product which constitutes the curable material of this invention is subsequently cured for the manufacture of articles.

Upon carrying out the urethanation reaction between polyisocyanate compound and polyhydroxy compound in the first stage of the second procedure, exothermic reaction is involved. In order to avoid a rapid and great temperature elevation, therefore, the reaction may preferably be conducted while the temperature in the reaction mixture is controlled by admixing polyhydroxy compound in small portions or dropwise with polyisocyanate compound.

In the next (second) stage of this procedure, the terminal and/or pendant isocyanate groups which are remaining unreacted in the intermediate partially urethanated product of the first stage are reacted with bicyclic orthoester compound [II] to form further urethane linkages. The intermediate partially urethanated product of the kind as obtained in the first stage are commercially available, and such commercially available products may be used in this invention.

The amount of ortho-ester compound [II] used in this second stage is usually such that the ratio of the residual isocyanate equivalents of the intermediate partially urethanated product of the first stage to the hydroxyl equivalents of the ortho-ester compound [II] is 1.0 or substantially 1.0. However, this ratio can be reduced less than 1.0, and the proportion of the ortho-ester compound [II] used is then further increased, when occasion demands.

In the exothermic urethanation reaction in this second stage, it is again preferred that the reaction is conducted while the temperature in the reaction mixture is controlled by admixing ortho-ester compound [II] in small portions or dropwise with the intermediate partially urethanated product from the first stage in order to avoid the excessive temperature elevation.

The final reaction product which is produced by the above-mentioned second procedure is comprising a mixture of urethanes of different chemical structures. For simplicity of illustration, such an instance is taken as an example, where a di-isocyanate compound as the polyisocyanate compound is reacted with a dihydroxy compound as the polyhydroxy compound in the first stage in such proportions that the ratio of the isocyanate equivalents to the hydroxyl equivalents in the reaction system is 1.0. In this instance, it is estimated that the reaction product from the second stage of this procedure comprises urethane of the formula

X—OOC—NH—A'—NH—COO—X  [V]

and urethanes of the formula

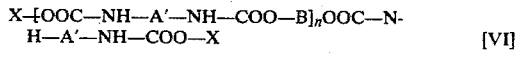

X—[OOC—NH—A'—NH—COO—B]$_n$OOC—N-H—A'—NH—COO—X  [VI]

wherein X is the bicyclic ortho-ester group [IV] referred to in respect of the urethane [III]; A' is the residue of di-isocyanate compound employed; and B is the residue of dihydroxy compound employed; and n is a value of more than 1. When the ratio of the isocyanate equivalents to the hydroxyl equivalents is increased beyond the value of 1.0 in the first stage of producing the intermediate urethane product, the proportion of the urethane [V] increases, as will be clear from the foregoing descriptions. On the other hand, when this ratio is reduced below the value of 1.0, the proportion of urethanes [VI] increases and the reaction product of the second stage is likely to have an increased molecular weight. According to this second procedure for preparing the curable material of this invention, it will be clear that the reaction product of the second stage contains, in addition to the urethanes of the formulae [V] and [VI], a minor porportion of urea product containing urea linkage (—NHCONH—) which would be formed from the reaction of the isocyanate group with the water occasionally existing in the reaction system.

(iii) The third procedure is also a two-stage process which comprises the first stage of reacting (A) at least one polyisocyanate compound with (C) at least one bicyclic ortho-ester compound [II] to form an intermediate partially urethanated product still containing at least one unreacted isocyanate group as the terminal and/or pendant groups, and the second stage of reacting the resulting intermediate product from the first stage with (B) at least one polyhydroxy compound to form further urethane linkages.

In the first stage of this third procedure, for instance, 1 mol. of a polyisocyanate having a functionality of f is reacted with (f−g) mol. of the ortho-ester compound [II] for formation of urethanes, there is produced such intermediate partially urethanated product in which on average, only g equivalents of the whole isocyanate groups of the starting polyisocyanate compound are remaining unreacted but the other quantity of the isocyanate groups have been urethanated, according to the following equation:

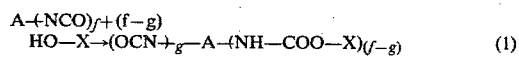

A—(NCO)$_f$+(f−g)
HO—X→(OCN)$_g$—A—(NH—COO—X)$_{(f-g)}$     (1)

wherein g is a value of more than zero but less than the value of f; and A and X have the same meanings as given hereinbefore.

The urethanation reaction in the above first stage may be conducted in such a manner that the temperature of the reaction mixture is controlled by adding ortho-ester compound [II] in small portions or dropwise to polyisocyanate compound in order to avoid any excessive elevation in temperature which would otherwise occur owing to the exothermic reaction.

In the next, second stage of the third procedure, the intermediate partially urethanated product from the first stage is reacted with polyhydroxy compound to form the further urethane linkages, giving as the final reaction product the curable material of this invention.

The amount of polyhydroxy compound used in this second stage may usually be such that the ratio of the residual isocyanate equivalents of the intermediate partially urethanated product from the first stage to the hydroxy equivalents of polyhydroxy compound charged is 1.0. However, it is possible that said ratio is reduced below the value of 1.0, depending on how much degree of polymerizability is to be imparted to the curable material of this invention as obtained. When polyisocyanate compound is reacted with ortho-ester compound [II] in the first stage to form the intermediate partially urethanated product, the amount of ortho-ester compound [II] used is typically such that the value of g is 1.0 or thereabout in respect to the equation (1), though the value of g is not necessarily limited to 1.0. When the amount of ortho-ester compound [II] used in the reaction of the equation (1) is far reduced below the value of (f−1), the resulting intermediate partially urethanated product of the first stage is likely to contain some remaining quantity of non-urethanated components or of lower urethanated components which would act so as to be linked, per molecule thereof, with two or more molecules of the polyhydroxyl compound and hence would increase excessively the viscosity of the resulting reaction product of the second stage occasionally even to such an extent that said reaction product would gel and not be utilizable. Therefore, it is usually not preferred that the amount of ortho-ester compound [II] is reduced to a level of far less than the value of (f−1).

On the contrary, when the amount of ortho-ester compound [II] is increased beyond the value of (f−1), namely when the value of g is less than 1, the proportion of the urethane [III] derived from the reaction of polyisocyanate compound with ortho-ester compound [II] increases. This urethane [III] essentially contains two or more bicyclic ortho-ester groups of the formula [IV] per molecule thereof and hence is a polyfunctionally opening-polymerizable compound, so that it serves to enhance the degree of formation of cross-linkages when the final reaction product of the second stage, that is, the curable material of this invention is subsequently cured.

In carrying out the urethanation reaction in the second stage of this third procedure, it is again preferred that the temperature in the reaction mixture is controlled by adding polyhydroxy compound in small portions or dropwise to the intermediate partially urethanated product of the first stage in order to avoid an excessive rise in temperature which would otherwise take place due to the exothermic reaction involved.

(iv) The fourth procedure is a three-stage process which comprises the first stage of reacting polyisocyanate compound with polyhydroxy compound to give an intermediate partially urethanated product still containing unreacted hydroxyl groups as the terminal group and/or as the pendant group; and the second and third stages where the terminal and/or pendant hydroxyl groups of the intermediate partially urethanated product from the first stage are reacted via the polyisocyanate compound with the ortho-ester compound [II] for introduction of the bicyclic ortho-ester group of the formula [IV]. These second and third stages may be conducted in some different ways.

In the first stage of this fourth procedure, the amount of polyhydroxy compound used may be such that the ratio of the isocyanate equivalents of the polyisocyanate compound to the hydroxyl equivalents of the polyhydroxy compound is about 0.9 or less. By changing this ratio, it is feasible to control the molecular weight of the resulting intermediate partially urethanated product. The molecular weight of this intermediate urethane product may usually not exceed 10,000. If the amount of polyisocyanate compound used is increased so that the ratio of the isocyanate equivalents to the hydroxyl equivalents is more than about 0.9, the final reaction product (the urethanes of the curable material of this invention) then derived from the subsequent third stage of this procedure can sometime have a considerably high molecular weight and disadvantageously show a higher viscosity and/or a too low curability.

The urethanation reaction of the first stage is exothermic, and it is preferred that the reaction proceeds in a controlled rate while the temperature of the reaction mixture is controlled by adding the polyhydroxy compound in small portions or dropwise to the polyisocyanate compound, in order to avoid an excessive rise in temperature which would occur due to the heat of reaction.

As stated above, the second and third stages of this fourth procedure may be worked in some different ways.

Thus, one way of carrying out the second and third stages is to react in the second stage the hydroxyl groups of the intermediate partially urethanated product of the first stage with polyisocyanate compound so as to form an urethane resin containing terminal and/or pendant isocyanate groups; and to react in the third stage the isocyanate groups of the resin product of the second stage with the ortho-ester compound [II] so as to give the curable material of this invention as the final reaction product.

An alternative way of carrying out the second and third stages of this fourth procedure is to react in the second stage at least one polyisocyanate compound with at least one bicyclic ortho-ester compound [II] used in an amount less than the amount required to urethanate all the isocyanate groups of the polyisocyanate compound employed, thereby forming an adduct product containing unreacted isocyanate groups and containing also the urethane groups which are bearing the bicyclic ortho-ester group of the formula [IV] shown hereinbefore; and to react in the third stage the remaining unreacted isocyanate groups of the adduct product of the second stage with the remaining hydroxyl groups of the intermediate partially urethanated polymer product which has been prepared in the first stage of this fourth procedure. In the second stage just above, for instance, there may be prepared such an adduct product in which some, for example, 1 equivalent of the isocyanate groups of the polyisocyanate compound remains unreacted but the other isocyanate groups have been urethanated with the ortho-ester compound [II], and which is illustrated, for example, by the urethane of the formula shown in the equation (1) given hereinbefore.

Either of the first way and the second way may be followed. In any case, the reaction of the isocyanate groups with the hydroxyl groups for the purpose of introducing the bicyclic ortho-ester groups should preferably be conducted in such a manner that the reaction proceeds in a controlled rate by adding either one of the polyisocyanate compound, the ortho-ester compound [II] and the above-mentioned adduct product in small portions or dropwise to the other in order to avoid an excessive rise in temperature which would take place due to the exothermic reaction involved.

Amongst the above-mentioned four procedures (i)—(iv), the second and third procedures comprising the two-stage reactions are preferred. Whenever anyone of the first to fourth procedures is followed, the reaction product obtained is a curable composition comprising a mixture of urethanes containing the bicyclic ortho-ester groups in the terminal group and/or in the pendant group thereof. This composition is a mixture comprising mainly the products derived from the reaction between the polyisocyanate compound and the ortho-ester compound [II], which products are the urethane [III], more especially, for example, the urethane [V], as well as the products derived from the reaction between the polyisocyanate compound, the polyhydroxy compound and the ortho-ester compound [II], more especially, for example, the urethanes of the formula [VI]. The proportion of the urethane [III] or [V] to the urethane [VI] may vary depending on the molar ratio of the starting materials used and the reaction conditions employed as well as on various factors of operation.

Accordingly, this invention further provides a new curable material comprising urethanes having as the terminal group and/or as the side-chain group at least one urethane group containing a bicyclic ortho-ester ring and represented by the formula

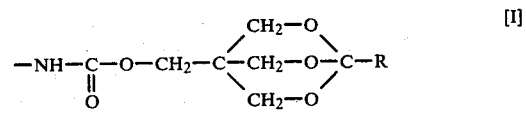

wherein R is a lower alkyl group, the urethanes being the reaction product formed (a) by reacting at a time (A) at least one polyisocyanate compound, (B) at least one polyhydroxy compound and (C) at least one bicyclic ortho-ester compound of the formula

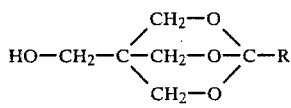
[II]

wherein R is as defined above; or (b) by reacting in a first stage (A) at least one polyisocyanate compound with (B) at least one polyhydroxy compound to form an intermediate partially urethanated product containing still at least one unreacted isocyanate group as the terminal and/or pendant group, and reacting in a second stage the isocyanate group of the intermediate product from the first stage with (C) at least one bicyclic ortho-ester compound [II]; or (c) by reacting in a first stage (A) at least one polyisocyanate compound with (C) at least one bicyclic ortho-ester compound [II] to form an intermediate partially urethanated product containing still at least one unreacted isocyanate group as the terminal and/or pendant group; and reacting in a second stage the intermediate product from the first stage with (B) at least one polyhydroxy compound; or (d) by reacting in a first stage (A) at least one polyisocyanate compound with (B) at least one polyhydroxy compound to form an intermediate partially urethanated product still containing unreacted hydroxyl groups as the terminal and/or pendant group, reacting in a second stage the hydroxyl groups of the intermediate product from the first stage with (A) at least one polyisocyanate compound to form an urethanation product containing terminal and/or pendant isocyanate groups, and reacting in a third stage the isocyanate groups of the urethane resin product from the second stage with (C) at least one bicyclic ortho-ester compound [II]; or (e) by reacting in a first stage (A) at least one polyisocyanate compound with (B) at least one polyhydroxy compound to form an intermediate partially urethanated product still containing unreacted hydroxyl groups as terminal and/or pendant group, reacting in a second stage (A) at least one polyisocyanate compound with (C) at least one bicyclic ortho-ester compound [II] used in an amount less than the quantity required to react with all the isocyanate groups of the polyisocyanate compound employed, thereby preparing an adduct product containing unreacted isocyanate groups and containing also the urethane groups which bear the bicyclic ortho-ester group of the formula [IV] indicated hereinbefore, and reacting in a third stage the intermediate urethane product from the first stage with the adduct product from the second stage.

According to a further aspect of this invention, there is provided a process for the production of a curable material comprising urethanes having as the terminal group and/or as the side-chain group at least one urethane group containing a bicyclic ortho-ester ring and represented by the formula

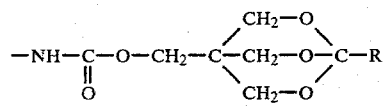
[I]

wherein R is a lower alkyl group, which process comprises reacting with each other (A) at least one polyisocyanate compound having at least two isocyanate groups, (B) at least one polyhydroxy compound having at least two hydroxyl groups and (C) at least one 1-alkyl-4-hydroxymethyl-2,6,7-trioxabicyclo[2,2,2]octane of the formula

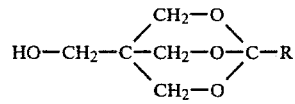
[II]

wherein R is as defined above, with the amount of the polyisocyanate compound used being such that the ratio of the isocyanate equivalents of the polyisocyanate compound to the hydroxyl equivalents of totally the polyhydroxy compound and the bicyclic ortho-ester compound of the formula [II] is in the range of 0.9 to 1.1.

More particularly, the process of this invention comprises either one of the following five routes (a)–(e):

(a) reacting at a time (A) at least one polyisocyanate compound, (B) at least one polyhydroxy compound and (C) at least one bicyclic ortho-ester compound of the formula [II] in a single stage, (b) by reacting in a first stage (A) at least one polyisocyanate compound with (B) at least one polyhydroxy compound to form an intermediate partially urethanated product containing still at least one unreacted isocyanate group as the terminal and/or pendant group, and reacting in a second stage the isocyanate group of the intermediate product from the first stage with (C) at least one bicyclic ortho-ester compound [II]; or (c) by reacting in a first stage (A) at least one polyisocyanate compound with (C) at least one bicyclic ortho-ester compound [II] to form an intermediate partially urethanated product containing still at least one unreacted isocyanate group as the terminal and/or pendant group; and reacting in a second stage the intermediate product from the first stage with (B) at least one polyhydroxy compound; or (d) by reacting in a first stage (A) at least one polyisocyanate compound with (B) at least one polyhydroxy compound to form an intermediate partially urethanated product still containing unreacted hydroxyl groups as the terminal and/or pendant group, reacting in a second stage the hydroxyl groups of the intermediate product from the first stage with (A) at least one polyisocyanate compound to form an urethanation product containing terminal and/or pendant isocyanate groups, and reacting in a third stage the isocyanate groups of the urethane resin product from the second stage with (C) at least one bicyclic ortho-ester compound [II]; or (e) by reacting in a first stage (A) at least one polyisocyanate compound with (B) at least one polyhydroxy compound to form an intermediate partially urethanated product still containing unreacted hydroxyl groups as terminal and/or pendant group, reacting in a second stage (A) at least one polyisocyanate compound with (C) at least one bicyclic ortho-ester compound [II] used in an amount less than the quantity required to react with all the isocyanate groups of the polyisocyanate compound employed, thereby preparing an adduct product containing unreacted isocyanate groups and containing also the urethane groups which bear the bicyclic ortho-ester group of the formula [IV] indicated hereinbefore, and reacting in a third stage the intermediate urethane product from the first stage with the adduct product from the second stage.

The polyisocyanate compounds carrying two or more isocyanate groups in their molecule which are to be used in this invention include aliphatic, alicyclic and aromatic polyisocyanates, examples of which are: tetramethylene diisocyanate, hexamethylene diisocyanate, lysine diisocyanate, 2,4- and 2,6-tolylene diisocyanate, diphenylmethane-4,4'-diisocyanate, m- and p-xylylene diisocyanate, dicyclohexylmethane-4,4'-diisocyanate, m- and p-phenylene diisocyanate, naphthalene-1,5-diisocyanate, idphenylene-4,4'-diisocyanate, cyclohexyl-1,4-diisocyanate, isophorone diisocyanate, 4,4'-diisocyanate diphenyl ether, triphenylmethane-4,4',4''-triisocyanate, 2,4,6-triisocyanate toluene, polymethylene polyphenyl isocyanate and the product of the reaction between water and hexamethylene diisocyanate at a molar ratio of 1:3.

These polyisocyanate compounds can be used alone or in admixture.

The polyhydroxy compounds carrying two or more hydroxyl groups for present use include polyhydric alcohols, polyester polyols, polyether polyols and polymer polyols. As examples of the polyhydric alcohols which include aliphatic, alicyclic, aromatic and aromatic-aliphatic polyols and those bearing one or more ether linkages formed by condensation of one or more polyols, there may be mentioned ethylene glycol, propylene glycol, 1,3-, 1,4- or 2,3-butanediol, pentamethylene glycol, hexamethylene glycol, octamethylene glycol, nonamethylene glycol, decamethylene glycol, neopentyl glycol, bisphenol A, hydrogenated bisphenol A, cyclohexane-1,4-dimethanol, m- or p-xylydene glycol, dibromoneopentyl glycol, cyclohexane-1,4-diol, chloropropylene glycol, 2-ethylhexane-1,3 (or 1,6)-diol, diethylene glycol, triethylene glycol, dipropylene glycol, bisphenol A dioxyethyl ether, bisphenol A dioxypropyl ether, glycerol, trimethylolpropane, trimethylolethane trimethylolmethane, pentaerythritol, sorbitol and erythritol.

The polyester polyols include products obtained by ring-opening polymerization of various lactones of four- six- or seven-membered ring or higher lactones (e.g. β-propiolactone, σ-valerolactone and ε-caprolactone and substituted derivatives thereof), in the presence or absence of a catalyst with the aid of an alkylene glycol such as ethylene glycol, 1,2-propylene glycol or the like; and polyester polyols produced by reaction of polycarboxylic acids with polyhydric alcohols as mentioned above. Examples of the polycarboxylic acids to be used for this purpose include phthalic acid, isophthalic acid, terephthalic acid, tetrahydrophthalic acid, hexahydrophthalic acid, 3,6-endomethylene-1,2,3,6-tetrahydrophthalic acid, 3,6-endodimethylmethylene-1,2,3,6-tetrahydrophthalic acid, tetrachlorophthalic acid, tetrabromophthalic acid, 1,4,5,6,7,7-hexachloro-5-norbornene-2,3-dicarboxylic acid, methyl-hexahydrophthalic acid, oxalic acid, malonic acid, succinic acid, glutaric acid, adipic acid, sebacic acid, dodecanoic diacid, maleic acid, fumaric acid, itaconic acid, ethylmalonic acid, 1,4-cyclohexene-dicarboxylic acid, α-methylitaconic acid, 2-methylsuccinic acid, pimelic acid, suberic acid, azelaic acid, halogenated tetrahydrophthalic acid, trimellitic acid, methylcyclohexene-tricarboxylic acid, aconitic acid and pyromellitic acid. Anhydrides, acyl halides and lower alkyl esters of these polycarboxylic acids may also be used for the same purpose.

The polyether polyols include polyalkylene oxides such as polyethylene glycol, polypropylene glycol, polytetramethylene glycol and ethylene oxide-propylene oxide copolymer; alkylene oxide adducts of bisphenols, hydrogenated bisphenols or halogenated bisphenols; and polyepichlorohydrin.

The polymer polyols include hydroxyl-containing polybutadiene, hydroxyl-containing copolymer of butadiene with styrene, copolymers of acrylic esters with hydroxyalkyl acrylates, alkylene oxide adducts of polybutadiene and products of reactions between alkylstyrenes and polyether polyols, between acrylonitrile and polyether polyols and between epoxy resins and aliphatic or alicyclic alcohols.

In preparing the curable material of this invention, there may optionally be present in the reaction system a substance which is inert to isocyanate group (NCO) as well as a suitable catalyst. The substance being inert to isocyanate group may serve as an inert solvent or as a reactive diluent which is non-reactive with isocyanate group but curable upon the curing of the curable material of the invention.

The inert solvent which may be used includes any conventional ones which do not interfere with the reaction, for example, aromatic hydrocarbons such as benzene and toluene; halogenated hydrocarbons such as methylene chloride, ethylene chloride and carbon tetrachloride; esters such as ethyl acetate and butyl acetate; ethers such as diisopropyl ether and di-n-butyl ether; and ketones such as acetone and methyl ethyl ketone.

Examples of the reactive diluent to be possibly used include monoepoxy compounds such as phenyl glycidyl ether, butyl glycidyl ether, 2-ethylhexyl glycidyl ether and cresyl glycidyl ether; polyepoxy compounds such as diglycidyl ether, ethylene glycol diglycidyl ether, diethylene glycol diglycidyl ether, vinylcyclohexene, diepoxide, resorcinol diglycidyl ether, neopenthyl glycol diglycidyl ether, trimethylolpropane polyglycidyl ether and epoxy resins of bisphenol A type and hydrogenated bisphenol A type; spiro orthoester compounds such as 1,4,6-trioxaspiro[3,4]octane, 2-methyl-1,4,6-trioxaspiro[3,4]octane, 2-halogenated methyl-1,4,6-trioxa[3,4]octane, 1,4,6-trioxaspiro[4,6]undecane and 2,3-dimethyl-1,4,6-trioxaspiro[4,6]undecane; and vinyl ethers such as n-butyl vinyl ether, isopropyl vinyl ether, octadecyl vinyl ether and 2-chloromethyl vinyl ether.

The catalyst which may be present in the reaction system includes organic amines and organometallic compounds. Among the organometallic compounds, organotin compounds are particularly suitable. Specific examples of the usable catalyst include triethylenediamine, morpholine, N-methylmorpholine, piperazine, triethanolamine, triethylamine, N,N,N',N'-tetramethyl-1,3-butanediamine, dibutyltin dilaurate, stannous octoate, stannous laurate, dioctyltin diacetate, dibutyltin oxide and lead octoate.

The amount of the catalyst to be used will depend on its nature and the reaction conditions to be employed, although it is generally in the range from 0.0001 to 0.5% by weight of polyisocyanate compound used.

The reaction temperature to be employed in any step of the process is usually from 20° to 100° C., preferably from 50° to 85° C.

The duration to be required for the reaction will depend on various factors including the nature and molar ratio of the starting materials, the temperature and the reaction scale employed. In general, however, the reaction will be completed when the isocyanate residue present in the reaction product resulting in the last step has reached a predetermined level, for example, of lower than 0.5%.

The compounds of above formula [II] are newly described and claimed in our copending Japanese Patent Application No. 11432/80; U.S. patent application Ser. No. 230,537; and German patent application P. 3103779.8. These compounds may be prepared by the reaction between pentaerythritol and a trialkyl orthoacylate of the formula:

$$R\text{—}C{+}O\text{—}R')_3 \qquad \text{[VII]}$$

where R is as defined above and R' is an alkyl, preferably lower alkyl group of 1-6 carbon atoms. The reaction scheme is shown as follows:

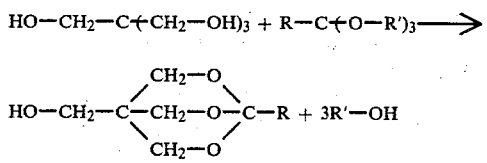

The above reaction is usually carried out in a suitable solvent such as di-n-octyl phthalate or di-n-butyl phthalate in the presence of a catalyst, for example, p-toluenesulfonic acid. The reaction may generally be effected at an elevated temperature, for example, of 100° to 140° C. under an atmosphere of an inert gas such as nitrogen. The reagents may be reacted with each other at an equimolar ratio, although either reagent may be used in slight excess.

The extent to which the reaction has proceeded can be monitored by measuring the quantity of the alcohol distilled off or by analyzing the resulting reaction solution, for example, by liquid chromatography. The desired product may be isolated from the reaction mixture by a conventional technique, for instance, by distillation under reduced pressure or fractional crystallization depending upon the nature of the product.

The compounds of formula [VII] are known per se or may be prepared by a known method as described in J.A.C.S., 64, 1825-1827 (1942).

As stated hereinbefore, we have found that the curable material of this invention can undergo cationic polymerization in the presence of a suitable catalyst (polymerization initiator) whereby the bicyclo orthoester ring existing as the pendant terminal and/or side group is opened to produce a crosslinked polymer.

It is well known that upon curing by ring-opening polymerization of hitherto known resins such as epoxy resins, there occurs a considerable shrinkage in voluem. For instance, the calculated shrinkage in volume of epoxy resins of bisphenol A type on curing is about 2.5% for diglycidyl ether/diaminodiphenylmethane system, about 4% for tetraglycidyl-m-xylenediamine/-diaminodiphenylmethane system and about 5% for tetraglycidyl-1,3-bis(aminoethyl)cyclohexane/-diaminodiphenyl methane. Such appreciable shrinkage on curing gives rise to the problems or drawbacks as already discussed.

In contrast, the curable material of this invention indicates no substantial change in volume during its curing, that is to say, an extremely small shrinkage or even a small expansion in volume. Thus, for example, the curable urethane material obtained by reaction between 2,4-tolylene diisocyanate and 1,4-butanediol at a molar ratio of 2:1 followed by further reaction with two molar proportion of 1-ethyl-4-hydroxymethyl-2,6,7-trioxabicyclo[2,2,2]octane indicates a calculated expansion in volume of about 0.4%, and the urethane material which is the reaction product of 2,4-tolylene diisocyanate/polyneopentyl adipate/1-ethyl-4-hydroxymethyl-2,6,7-trioxabicyclo[2,2,2]octane (see Example 3) presents a very small shrinkage in volume of c.a. 0.3%.

The shrinkage in volume (%) under discussion is calculated by the equation:

$$\left[1 - \frac{\text{Specific gravity of curable material}}{\text{Specific gravity of cured polymer}}\right] \times 100$$

and the expansion in volume (%) is calculated by the equation:

$$\left[\frac{\text{Specific gravity of curable material}}{\text{Specific gravity of cured polymer}} - 1\right] \times 100$$

The curable materials of this invention have the aforesaid characteristics that they can prepared in a facile way and that they can undergo cationic ring-opening polymerization with an expansion or a very small shrinkage in volume. Thus, they are very useful as molding and casting materials, composite materials, adhesives and paints.

The cationic polymerization of the curable material may be carried out by a conventional technique known per se, for example, by irradiation with ultraviolet rays, infrared rays or microwaves or application of heat in the presence of a suitable catalyst (initiator).

Examples of the catalyst which may be used for ultraviolet cationic polymerization include: aromatic diazonium salts such as

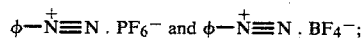

aromatic halonium salts such as $\phi\text{—}I^+\text{—}\phi\cdot BF_4^-$; aromatic onium salts of the elements of Group Va of the Periodic Table such as

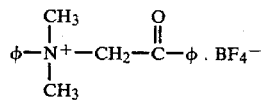

and aromatic onium salts of the elements of Group VIa of the Periodic Table such as

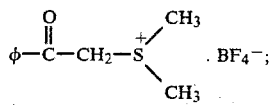

dicarbonyl chelates of the Group IIIa–Va elements of the Periodic Table such as

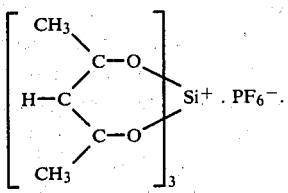

These initiators may be used alone or in combination.

As the polymerization initiator usable for other modes of cationic polymerization by means of heat energy such as infrared rays, heat or microwaves, there may be mentioned Lewis acids such as $BF_3$, $FeCl_3$, $SnCl_4$, $SbCl_5$, $SbF_3$, $TiCl_4$, etc.; coordination compounds of Lewis acids with compounds bearing O, S or N such as $BF_3OEt_2$, $BF_3$-aniline complexes, etc.; oxonium salts, diazonium salts and carbonium salts of Lewis acids; halides, mixed halides; and perhalogeno-acid derivatives. These initiators may be used alone or in combination.

The initiator is generally used in an amount of 0.001 to 10% by weight, preferably 0.1 to 5% by weight based on the weight of the curable material. The polymerization temperature is not critical, although it is generally between room temperature (c.a. 25° C.) and 200° C.

This invention is further illustrated but not limited by the following Examples, in which the specific gravity of the products was measured by Method A, B, or C as follows:

Method A: measured at 25° C. by gradient tube method using B-type direct-reading specific gravimeter (manufactured by Shibayama Kagaku Kikai Seisakujo, Japan) wherein a sample of the product was degassed in an aqueous solution of potassium carbonate and placed in a gradient tube prepared from aqueous potassium carbonate solution.

Method B: measured at 25° C. using a specific gravity bottle.

Method C: measured at 25° C. using an air-comparative gravimeter of 930 type (manufactured by Beckmann Japan Co., Ltd.).

The viscosity of the final products was measured using Visconic E-ST viscometer (manufactured by Tokyo Keiki K.K., Japan).

The shrinkage or expansion in volume which occurred upon the polymerization (curing) was calculated by the equations as given hereinbefore.

EXAMPLE 1

17.8 g (0.08 moles) of isophorone diisocyanate and 0.01 g of dibutyltin dilaurate as catalyst were placed in a 200 ml four-necked flask fitted with a stirrer, a condenser, an inlet for nitrogen gas and a dropping funnel. The mixture in the flask was heated to 70° C. on an oil bath and to the mixture was then added dropwise 40.0 g (0.04 moles) of polypropylene glycol (average molecular weight=1000) over about one hour under nitrogen atmosphere. The resultant mixture was allowed to stand at 70° C. for further two hours to effect the reaction for addition of the isophorone diisocyanate to the terminals of the polypropylene glycol molecule.

Subsequently, 13.9 g (0.08 moles) of 1-ethyl-4-hydroxymethyl-2,6,7-trioxabicyclo[2,2,2]octane was added dropwise over about 30 minutes to the reaction mixture, which was then kept aside at 75° C. for 4 hours.

The reaction product thus obtained had nearly zero content of isocyanate residue, a viscosity of 100,000 centipoises at 50° C. and a specific gravity of 1.089 (Method B).

The 1-ethyl-4-hydroxymethyl-2,6,7-trioxabicyclo[2,2,2]octane used in the above process was prepared as follows:

In a 2 l flask were placed 272 g (2 moles) of pentaerythritol, 352 g (2 moles) of triethyl orthopropionate, 350 g of di-n-octyl phthalate and 2 g of p-toluenesulfonic acid as catalyst and the resultant mixture was heated to a temperature of 110° C. and slowly raised to 140° C. with stirring under nitrogen atmosphere. The rise in temperature was accompanied by formation of ethanol, which was distilled off. After the reaction for about 4 hours, there was obtained 261 g of the distillate predominantly comprising ethanol.

Subsequently, 4 ml of triethylamine was added to the reaction solution after cooling to neutralize the catalyst, the mixture was allowed to settle and the supernatant was distilled under reduced pressure to yield 247 g (71%) of the object compound with a boiling point of 97°–100° C./0.2 mmHg.

EXAMPLE 2

Into a flask similar to that used in Example 1 were introduced 15.6 g (0.09 moles) of 2,4-tolylene diisocyanate and 0.02 g of dibutyltin dilaurate as catalyst. The mixture in the flask was heated at 70° C. on an oil bath, and to the mixture was then added dropwise 32.0 g (0.04 moles) of polyneopentyl adipate (average molecular weight=800) over about one hour under nitrogen stream. The resulting mixture was stirred at 70° C. for two hours, and 17.4 g (0.10 mole) of 1-ethyl-4-hydroxymethyl-2,6,7-trioxabicyclo [2,2,2]octane was then added dropwise over about one hour to the reaction mixture obtained. The resultant mixture was kept at 70° C. for further three hours to complete the reaction. There was obtained the reaction product which was in the form of semi-solid at ambient temperature.

The reaction product thus obtained had a viscosity of 420,000 centipoises at 70° C., nearly zero content of isocyanate residue and a specific gravity of 1.191 (Method C).

EXAMPLE 3

8.7 g (0.05 moles) of 2,4-tolylene diisocyanate was placed in a flask similar to that used in Example 1 and heated at 75° C. on an oil bath. To the content in the flask was then added dropwise 24.0 g (0.03 moles) of polyneopentyl adipate containing terminal hydroxyl groups (average molecular weight=800) over about one hour under nitrogen stream. 30 Minutes after completion of the addition, 0.01 g of dibutyltin dilaurate as catalyst was added to the reaction mixture, which was then stirred for further 1.5 hours to effect the reaction for addition of the 2,4-tolylene diisocyanate to the terminal hydroxyl groups of the polyneopentyl adipate molecule.

Subsequently, 6.96 g (0.04 moles) of 1-ethyl-4-hydroxymethyl-2,6,7-trioxabicyclo[2,2,2]octane was added dropwise over about 30 minutes to the resulting reaction mixture, which was then kept at 70° C. for further hour hours. There was obtained the reaction product which was in the semi-solid form at ambient temperature.

The reaction product thus obtained had a viscosity of about 530,000 centipoises at 70° C. and a specific gravity of 1.180 (Method C).

EXAMPLE 4

Into a flask similar to that used in Example 1 were added 10.48 g (0.040 moles) of dicyclohexylmethane-4,4'-diisocyanate and 0.01 g of dibutyltin dilaurate as catalyst. The mixture in the flask was heated at 70° C. on an oil bath, and to the mixture was then added dropwise 16.8 g (0.0168 moles) of polyethylene adipate containing terminal hydroxyl groups (average molecular weight=1000) over about 30 minutes under nitrogen stream. The resulting mixture was then stirred at 70° C. for further 2.5 hours to effect the reaction for addition of the dicyclohexylmethane-4,4'-diisocyanate to the terminal hydroxyl groups of the polyethylene adipate molecule.

Subsequently, 8.35 g (0.048 moles) of 1-ethyl-4-hydroxymethyl-2,6,7-trioxabicyclo[2,2,2]octane was added dropwise over about 30 minutes to the resulting reaction mixture, which was then kept for further four hours to complete the reaction. There was obtained the reaction product which was in the form of solid at ambient temperature.

The reaction product thus obtained had a viscosity of 1,800,000 centipoises at 50° C. and a specific gravity of 1.201 (Method C).

EXAMPLE 5

To a flask similar to that used in Example 1 were added 6.72 g (0.04 moles) of hexamethylene diisocyanate and 0.01 g of dibutyltin dilaurate as catalyst. The mixture in the flask was heated at 70° C. on an oil bath and to the mixture was then added dropwise 18.0 g (0.02 moles) of bisphenol A-propylene oxide adduct (average molecular weight=900) over 30 minutes under nitrogen stream. The resulting mixture was then stirred at 70° C. for further 2.5 hours.

Subsequently, 6.96 g (0.04 moles) of 1-ethyl-4-hydroxymethyl-2,6,7-trioxabicyclo[2,2,2]octane was added dropwise over about 30 minutes to the resulting reaction mixture, which was kept aside at 70° C. for further four hours. There was thus obtained the viscous reaction product which had a viscosity of 73,000 centipoises at 50° C. and a specific gravity of 1.107 (Method C).

EXAMPLE 6

13.9 g (0.08 moles) of 2,4-tolylene diisocyanate, 0.02 g of dibutylin dilaurate and 0.04 g of hydroquinone monomethylether were placed in a 200 ml four-necked flask fitted with a stirrer, a condenser, an inlet for nitrogen gas and a dropping funnel. The mixture in the flask was heated to 70° C. on an oil bath and to the mixture was then added dropwise 52.5 g (0.04 moles) of α,ω-polybutadiene glycol (average molecular weight=1300) over about one hour under nitrogen stream. The resultant mixture was kept at 70° C. for further two hours to effect the reaction for addition of the 2,4-tolylene diisocyanate to the terminal hydroxyl groups of the polybutadiene glycol molecule.

Subsequently, 13.9 g (0.08 moles) of 1-ethyl-4-hydroxymethyl-2,6,7-trioxabicyclo[2,2,2]octane was added dropwise over about 30 minutes to the reaction mixture, which was kept at 70° C. for further three hours to yield the reaction product which was semi-solid at ambient temperature.

The reaction product thus obtained had a viscosity of 870,000 centipoises at 70° C. and a specific gravity of 1.002 (Method C).

EXAMPLE 7

To a flask similar to that used in Example 1 were added 6.96 g (0.04 moles) of 2,4-tolylene diisocyanate, 20 ml of toluene, 1.80 g (0.02 moles) of 1,4-butane diol and 0.01 g of dibutyltin dilaurate as catalyst. The mixture in the flask was heated at 70° C. on an oil bath and stirred for 3 hours. 6.96 g (0.04 moles) of 1-ethyl-4-hydroxymethyl-2,6,7-trioxabicyclo[2,2,2]octane was then added dropwise over about 30 minutes to the reaction mixture, which was kept aside at 75° C. for further five hours. After completion of the reaction, the reaction solution was distilled under reduced pressure to remove the toluene to afford the reaction product in the form of solid powder which had a specific gravity of 1.278 (Method C).

EXAMPLE 8

Into a flask similar to that used in Example 1 were charged 3.36 g (0.02 moles) of hexamethylene diisocyanate, 9.0 g (0.01 mole) of bisphenol A-propylene oxide adduct (average molecular weight=900) and 0.005 g of dibutyltin dilaurate as catalyst. The mixture in the flask was heated at 70° C. on an oil bath and kept at 70° C. for 2 hours. 3.2 g (0.02 moles) of 1-methyl-4-hydroxymethyl-2,6,7-trioxabicyclo[2,2,2]octane was then added to the reaction mixture, which was kept for further three hours. There was finally obtained the viscous reaction product which had a viscosity of 105,000 centipoises at 50° C. and a specific gravity of 1.119 (Method B).

The 1-methyl-4-hydroxymethyl-2,6,7-trioxabicyclo[2,2,2]octane used in the above process was prepared as follows:

In a 1 l flask were placed 136 g (1 mole) of pentaerythritol, 162 g (1 mole) of triethyl orthoacetate, 250 g of di-n-butyl phthalate and 0.5 g of p-toluene-sulfonic acid as catalyst and the resultant mixture was slowly raised to a temperature of 135° C. with stirring under nitrogen atmosphere. The rise in temperature was accompanied with formation of ethanol, which was distilled off. The reaction mixture was kept at 135° C. for four hours to complete the reaction and there was obtained 126 g of the distillate predominantly comprising ethanol.

Subsequently, 1 ml of triethylamine was added to the reaction solution after cooling to neutralize the catalyst and the precipitate formed was then filtered off. The resulting filtrate was allowed to settle overnight at room temperature to separate a crystalline substance. The crystalline substance was filtered off and distilled under reduced pressure while heating the distillation column with a ribbon heater to prevent the crystalline substance from deposition. By this procedure, there was obtained 60.1 g (37.5%) of the desired 1-methyl-4-hydroxymethyl-2,6,7-trioxabicyclo[2,2,2]octane with a boiling point of 107° C./0.3 mmHg.

EXAMPLE 9

3.48 g of 1-ethyl-4-hydroxymethyl-2,6,7-trioxabicyclo[2,2,2]octane in 30 cc of ethyl acetate was added to 6.36 g of commercially available polyurethane, Colonate L (a product of Japan Polyurethane Co., Ltd.; reaction product of tolylene diisocyanate/trimethylol propane at a molar ratio of 3/1, NCO content=13.2%, solid content=75%) and the resultant mixture was kept at 75° C. for four hours. After completion of the reaction, the reaction mixture was distilled under reduced pressure to remove the ethyl acetate and there was obtained the solid reaction product which had a specific gravity of 1.288 (Method C).

EXAMPLE 10

In a flask similar to that used in Example 1 were charged 10 ml of toluene, 5.04 g (0.03 moles) of hexamethylene diisocyanate and 0.005 g of dibutyltin dilaurate as catalyst. The mixture in the flask was heated to 75° C. on an oil bath and to the mixture was then added dropwise over 30 minutes a solution of 5.22 g (0.03 moles) of 1-ethyl-4-hydroxymethyl-2,6,7-trioxabicyclo[2,2,2]octane in 10 ml of toluene with stirring. The resulting mixture was then stirred at 75° C. for further two hours to effect the reaction for addition of the hexamethylene diisocyanate to the terminal hydroxyl groups of the trioxabicyclo octane molecule.

Subsequently, a solution of 13.5 g (0.015 moles) of bisphenol A-propylene oxide adduct (average molecular weight=900) in 10 ml of toluene was added dropwise over 30 minutes to the reaction mixture, which was kept for further 2.5 hours. When the reaction was complete, the reaction solution was evaporated on a rotary evaporator to remove the solvent. There was thus obtained the viscous reaction product which had a viscosity of about 20,000 centipoises at 50° C. and nearly zero content of isocyanate residue.

EXAMPLE 11

In a flask similar to that used in Example 1 were charged 30 ml of toluene, 5.22 g (0.03 moles) of 1-ethyl-4-hydroxymethyl-2,6,7-trioxabicyclo[2,2,2]octane and 13.5 g (0.015 moles) of bisphenol A-propylene oxide adduct (average molecular weight=900) and the mixture was stirred to give a homogeneous solution. Subsequently, 5.04 g (0.03 moles) of hexamethylene diisocyanate was added to the solution and the resulting mixture was slowly raised to a temperature of 70° C. with stirring and kept at this temperature for 30 minutes. 0.005 g of dibutyltin dilaurate as catalyst was then added to the reaction solution, which was kept aside at 80° C. for further three hours to complete the reaction. The resultant reaction solution was evaporated on a rotary evaporator to remove the toluene. There was finally obtained the viscous reaction product by the one-step urethane-forming reaction.

The infrared spectroscopy showed that the reaction product thus obtained was free from isocyanate residue. The reaction product had a viscosity of about 20,000 centipoises at 50° C. and it was found by liquid chromatography to have the same molecular weight distribution as that of the product obtained in Example 10.

EXAMPLE 12

In a flask similar to that used in Example 1 were placed 6.96 g (0.04 moles) of 2,4-tolylene diisocyanate and 10 ml of toluene. The mixture in the flask was heated to 80° C. on an oil bath and to the mixture was then added dropwise over 30 minutes a solution of 6.96 g (0.04 moles) of 1-ethyl-4-hydroxymethyl-2,6,7-trioxabicyclo[2,2,2]octane in 10 ml of toluene with stirring. The resultant mixture was kept at 80° C. for further two hours to form a partially urethanated product.

In another flask similar to that used in the above process were placed 20 ml of toluene, 0.005 g of dibutyltin dilaurate as catalyst and 24.0 g (0.03 moles) of polyneopentyl adipate containing terminal hydroxyl groups (average molecular weight=800). The mixture in the flask was heated to 80° C. on an oil bath and to the mixture was added dropwise a solution of 1.68 g (0.01 mole) of hexamethylene diisocyanate in 10 ml of toluene with stirring. The resultant reaction mixture was kept at 80° C. for two hours to effect the reaction for addition of the hexamethylene diisocyanate to the terminal hydroxyl groups of the polyneopentyl adipate molecule.

To the reaction mixture was then added dropwise over 30 minutes the partially urethanated product prepared as just above. When the addition was completed, the resultant mixture was allowed to stand at 80° C. for further 2.5 hours to complete the reaction, after which the reaction mixture was evaporated on a rotary evaporator to remove the toluene. There was finally obtained the reaction product which was in the semi-solid form at ambient temperature, and which had a viscosity of about 450,000 centipoises at 70° C. and nearly zero content of isocyanate residue.

The following Examples illustrate the polymerization with curing of the reaction products as prepared in the aforegoing Examples.

EXAMPLE 13

The reaction product obtained in Example 4 was placed in a tube, into which was charged 3% by weight, based on the weight of the product, $BF_3O(C_2H_5)_2$ as catalyst. The tube was sealed and then heated at 125° C. for 24 hours to give a crosslinked rigid polymer which had a Shore hardness of D-55. The polymer had a specific gravity of 1.210 (Method B), indicating a calculated shrinkage in volume of only about 0.8% which took place upon the polymerization.

EXAMPLE 14

The procedure of Example 13 was repeated but using the reaction product obtained in Example 5 to yield a crosslinked flexible polymer with a Shore hardness of A-40. The polymer had a specific gravity of 1.118 (Method B), indicating a calculated shrinkage of only approx. 1.0% which occurred upon the polymerization.

EXAMPLE 15

The reaction product obtained in Example 1 was placed in a tube, into which was charged 3% by weight, based on the weight of the product, $BF_3$-monoethylamine complex as catalyst. The tube was sealed and then heated at 150° C. for 6 hours to give a crosslinked flexible polymer which had a Shore hardness of A-70. The polymer had a specific gravity of 1.100 (Method B), indicating a calculated shrinkage in volume of about 1.0% which took place upon the polymerization.

EXAMPLE 16

The procedure of Example 15 was repeated but using the reaction product obtained in Example 3 to yield a crosslinked rigid polymer with a Shore hardness of D-47. The polymer had a specific gravity of 1.184 (Method A), indicating a calculated shrinkage of only approx. 0.4% which occurred upon the polymerization.

EXAMPLE 17

By the same procedure as in Example 15 except using the reaction product obtained in Example 7, a crosslinked polymer with a Shore hardness of D-40 was produced which had a specific gravity of 1.273 (Method A), indicating a calculated expansion in volume of approx. 0.4% which took place during the polymerization.

EXAMPLE 18

By the same procedure as in Example 15 except using the reaction product obtained in Example 2, a crosslinked polymer with a Shore hardness of D-55 was produced which had a specific gravity of 1.198, indicating a calculated expansion in volume of approx. 0.6% which took place during the polymerization.

EXAMPLE 19

The procedure of Example 15 was repeated but using the reaction product obtained in Example 6 to yield a crosslinked polymer with a Shore hardness of D-40.

EXAMPLE 20

By the same procedure as in Example 15 except using the reaction product obtained in Example 8, a crosslinked flexible polymer was produced which had a specific gravity of 1.133 (Method A), indicating a calculated shrinkage in volume of approx. 1.2% which took place during the polymerization.

EXAMPLE 21

The procedure of Example 15 was repeated but using the reaction product obtained in Example 9 to yield a crosslinked rigid polymer. The polymer had a specific gravity of 1.300 (Method A), indicating a calculated shrinkage of approx. 0.9% which occurred upon the polymerization.

What we claim is:

1. A curable material comprising urethanes having as the terminal group and/or as the side-chain group at least one urethane group containing a bicyclic ortho-ester ring and represented by the formula

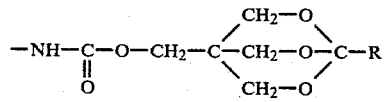

wherein R is a lower alkyl group, the urethanes being the reaction product formed by reacting (A) at least one polyisocyanate compound having at least two isocyanate groups, (B) at least one polyhydroxy compound having at least two hydroxyl groups and (C) at least one 1-alkyl-4-hydroxymethyl-2,6,7-trioxabicyclo[2,2,2]octane of the formula

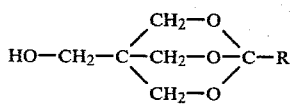

wherein R is as defined above.

2. A curable material as claimed in claim 1 in which the amount of the polyisocyanate compound used for formation of the urethanes is such that the ratio of isocyanate equivalents of the polyisocyanate compound to total hydroxyl equivalents of the polyhydroxy compound and the bicyclic ortho-ester compound of the formula [II] is in the range of 0.9 to 1.1.

3. A curable material as claimed in claim 1 comprising urethanes having as the terminal group and/or as the side-chain group at least one urethane group containing a bicyclic ortho-ester ring and represented by the formula

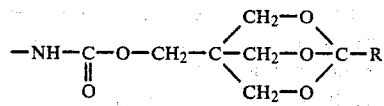

wherein R is a lower alkyl group, the urethanes being the reaction product formed
 (a) by reacting at a time (A) at least one polyisocyanate compound, (B) at least one polyhydroxy compound and (C) at least one bicyclic ortho-ester compound of the formula

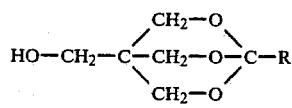

wherein R is as defined above; or
 (b) by reacting in a first stage (A) at least one polyisocyanate compound with (B) at least one polyhydroxy compound to form an intermediate partially urethanated product containing still at least one ureacted isocyanate group as the terminal and/or pendant group, and reacting in a second stage the isocyanate group of the intermediate product from the first stage with (C) at least one bicyclic ortho-ester compound [II]; or
 (c) by reacting in a first stage (A) at least one polyisocyanate compound with (C) at least one bicyclic ortho-ester compound [II] to form an intermediate partially urethanated product containing still at least one unreacted isocyanate group as the terminal and/or pendant group; and reacting in a second stage the intermediate product from the first stage with (B) at least one polyhydroxy compound; or
 (d) by reacting in a first stage (A) at least one polyisocyanate compound with (B) at least one polyhydroxy compound to form an intermediate partially urethanated product still containing unreacted hydroxyl groups as the terminal and/or pendant group, reacting in a second stage the hydroxyl groups of the intermediate product from the first stage with (A) at least one polyisocyanate compound to form an urethanation product containing terminal and/or pendant isocyanate groups, and reacting in a third stage the isocyanate groups of the urethane resin product from the second stage with (C) at least one bicyclic ortho-ester compound [II]; or
 (e) by reacting in a first stage (A) at least one polyisocyanate compound with (B) at least one polyhydroxy compound to form an intermediate partially urethanated product still containing unreacted hydroxyl groups as terminal and/or pendant group, reacting in a second stage (A) at least one polyisocyanate compound with (C) at least one bicyclic ortho-ester compound [II] used in an amount less than the quantity required to react with all the isocyanate groups of the polyisocyanate compound employed, thereby preparing an adduct product containing unreacted isocyanate groups and containing also the urethane groups which bear the bicyclic ortho-ester group of the formula [IV] indicated hereinbefore, and reacting in a third stage the intermediate urethane product from the first stage with the adduct product from the second stage.

4. A curable material as claimed in claim 3 in which the total amount of the polyisocyanate compound used is such that the ratio of isocyanate equivalents of the polyisocyanate compound totally employed to hydroxyl equivalents of the whole of the polyhydroxy compound and the bicyclic ortho-ester compound [II] totally used is in the range of 0.9 to 1.1.

5. A curable material as claimed in claim 1 or 3 which further contains a reactive diluent which is capable of cross-linking with the curable material upon the curing process of the latter and which is selected from monoepoxides, poly-epoxides, spiro-ortho-esters and vinyl ethers.

6. A curable material as claimed in claim 1 or 3 which further contains an inert diluent which is selected from aromatic solvents, hydrocarbon solvents, halogenated hydrocarbon solvents, ester solvents, ether solvents and ketone solvents.

7. A process for the production of a curable material of claim 1 comprising urethanes having as the terminal group and/or as the side-chain group at least one urethane group containing a bicyclic ortho-ester ring and represented by the formula

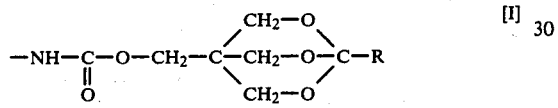

wherein R is a lower alkyl group, which process comprises reacting (A) at least one polyisocyanate compound having at least two isocyanate groups, (B) at least one polyhydroxy compound having at least two hydroxyl groups and (C) at least one 1-alkyl-4-hydroxymethyl-2,6,7-trioxabicyclo[2,2,2]octane of the formula

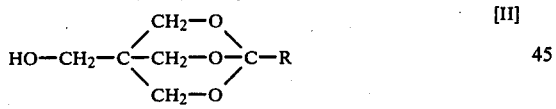

wherein R is as defined above, with the amount of the polyisocyanate compound used being such that the ratio of isocyanate equivalents of the polyisocyanate compound to total hydroxyl equivalents of the polyhydroxy compound and the bicyclic ortho-ester compound of the formula [II] is in the range of 0.9 to 1.1.

8. A process as claimed in claim 7, which comprises either one of the following five routes (a) to (e):
   (a) reacting at a time (A) at least one polyisocyanate compound, (B) at least one polyhydroxy compound and (C) at least one bicyclic ortho-ester compound of the formula [II] in a single stage;
   (b) reacting in a first stage (A) at least one polyisocyanate compound with (B) at least one polyhydroxy compound to form an intermediate partially urethanated product containing still at least one unreacted isocyanate group as the terminal and/or pendant group; and reacting in a second stage the isocyanate group of the intermediate product from the first stage with (C) at least one bicyclic ortho-ester compound [II];
   (c) reacting in a first stage (A) at least one polyisocyanate compound with (C) at least one bicyclic ortho-ester compound [II] to form an intermediate partially urethanated product containing still at least one unreacted isocyanate group as the terminal and/or pendant group; and reacting in a second stage the intermediate product from the first stage with (B) at least one polyhydroxy compound;
   (d) reacting in a first stage (A) at least one polyisocyanate compound with (B) at least one polyhydroxy compound to form an intermediate partially urethanated product still containing unreacted hydroxyl groups as the terminal and/or pendant group, reacting in a second stage the hydroxyl groups of the intermediate product from the first stage with (A) at least one polyisocyanate compound to form an urethane resin containing terminal and/or pendant isocyanate groups; and reacting in a third stage the isocyanate groups of the urethane resin product from the second stage with (C) at least one bicyclic ortho-ester compound [II]; and
   (e) reacting in a first stage (A) at least one polyisocyanate compound with (B) at least one polyhydroxy compound to form an intermediate partially urethanated product still containing unreacted hydroxyl groups as terminal and/or pendant group, reacting in a second stage (A) at least one polyisocyanate compound with (C) at least one bicyclic ortho-ester compound [II] used in an amount less than the quantity required to react with all the isocyanate groups of the polyisocyanate compound employed, thereby preparing an adduct product containing unreacted isocyanate groups and containing also the urethane groups which bear the bicyclic ortho-ester group of the formula [IV] indicated hereinbefore; and reacting in a third stage the intermediate urethane product from the first stage with the adduct product from the second stage.

* * * * *